(12) United States Patent
Hawkes

(10) Patent No.: US 8,421,432 B2
(45) Date of Patent: Apr. 16, 2013

(54) DC/DC CONVERTER HAVING A FAST AND ACCURATE AVERAGE CURRENT LIMIT

(75) Inventor: Charles Edward Hawkes, Cary, NC (US)

(73) Assignee: Linear Technology Corporation, Milpitas, CA (US)

( * ) Notice: Subject to any disclaimer, the term of this patent is extended or adjusted under 35 U.S.C. 154(b) by 320 days.

(21) Appl. No.: 12/884,013

(22) Filed: Sep. 16, 2010

(65) Prior Publication Data

US 2011/0062932 A1    Mar. 17, 2011

Related U.S. Application Data

(60) Provisional application No. 61/243,228, filed on Sep. 17, 2009.

(51) Int. Cl.
*G05F 1/00* (2006.01)
(52) U.S. Cl.
USPC .......................................... 323/288; 323/283
(58) Field of Classification Search .................. 323/288, 323/283, 284, 285
See application file for complete search history.

(56) References Cited

U.S. PATENT DOCUMENTS

| | | | |
|---|---|---|---|
| 5,717,322 | A | 2/1998 | Hawkes et al. |
| 6,057,675 | A | 5/2000 | Tateishi |
| 6,498,466 | B1 | 12/2002 | Edwards |
| 7,145,317 | B1 | 12/2006 | Shah |
| 8,169,205 | B2 * | 5/2012 | Chen et al. ............... 323/282 |
| 2007/0018624 | A1 | 1/2007 | Guo |
| 2007/0296389 | A1 | 12/2007 | Chen et al. |

FOREIGN PATENT DOCUMENTS

JP    63-305754 A    12/1988

OTHER PUBLICATIONS

Cooke, "Analysis of a Voltage Controlled Frequency Foldback Technique that Improves Short Circuit Protection for Buck Derived Converters," *Int Telecom Energy*,1996, pp. 749-755.
Extended European Search Report issued in European Patent Application No. 11000951.1, dated Apr. 28, 2011.
Extended European Search Report issued in European Patent Application No. 10009840.9, dated Apr. 6, 2011.
Extended European Search Report issued in European Patent Application No. 11000952.9, dated Mar. 5, 2011.

* cited by examiner

*Primary Examiner* — Shawn Riley
(74) *Attorney, Agent, or Firm* — McDermott Will & Emery LLP

(57) ABSTRACT

Three modifications are provided to obtain a fast and accurate average current limit in a DC/DC converter. The first modification relates to providing a bias signal control configured to apply a variable DC bias signal to the compensation ramp signal generated in the DC/DC converter so that the compensating ramp signal is biased to zero at the end of each ON-time for each cycle so that the peak current limit is independent of the duty cycle of the pulse width modulation signal during current limit conditions. A second modification relates to modulating the clamp voltage that establishes the peak current limit as a function of ripple of the inductor current for each cycle of the pulse width modulation signal so as to reduce or cancel the effect of the inductor ripple current on the average output current during current limit conditions. The third modification relates to adjusting the frequency of the pulse width modulation signal during current limit conditions as a function of both the input voltage and the output voltage of the DC/DC converter.

25 Claims, 8 Drawing Sheets

DC/DC CONVERTER HAVING A FAST AND ACCURATE AVERAGE CURRENT LIMIT

RELATED APPLICATION

This application relates to and claims priority from U.S. Provisional Patent Application No. 61/243,228 filed Sep. 17, 2009 in the name of Charles E. Hawkes and entitled DC/DC Converter Having a Fast and Accurate Average Current Limit.

TECHNICAL FIELD

The present disclosure relates generally to DC/DC converters, and more particularly to a DC/DC converter having a fast and accurate average current limit.

BACKGROUND

Step-Down, or Buck DC/DC converters that employ a peak-current control architecture are widely used to step from a higher input voltage level to a lower output voltage level while maintaining very high efficiency. This control scheme uses an error amplifier to amplify the difference between the output voltage and a reference voltage. The resulting error voltage is then used to adjust the peak current in a power switch, thereby controlling the current delivered to the load and the resulting output voltage. Typically, such converters also make use of a compensating ramp to ensure stability. Under normal operating conditions, the output voltage is regulated so as to be essentially constant as the load current is varied. However, when the load current increases to a given design limit, it is desirable to allow the output voltage to decrease so as to maintain a constant output current. This is important to avoid damage either to the load or to the converter itself. A constant output current behavior is also important, for example, when a DC/DC converter is used to supply voltage to a large bank of capacitors. During start-up into such a load, the capacitors will initially appear as a short circuit. In order to ensure a smooth and reliable start-up, the output current must be quickly and accurately limited to a constant level. This constant output current will charge the capacitors until the voltage reaches the desired output regulation level, at which point the output current will decrease and the output voltage will settle at the regulation level.

There are, however, three significant obstacles to achieving a constant average output current characteristic during current limit. The first is the variation in the peak current limit with duty cycle due the compensating ramp.

Variation in Peak Current Limit with Duty Cycle

FIG. 1 shows a block diagram of a typical DC/DC converter using a peak-current control scheme. The converter includes a feedback arrangement including an error amplifier U3 that provides an error signal VERR1 as a function of the difference between the output voltage VOUT and a reference voltage VREF. The VERR1 signal is applied to the summer Σ. Summer Σ generates an error signal VERR2 representative of the difference between the VERR1 signal less a compensating ramp signal VRAMP. Using a comparator U1, VERR2 is compared to a voltage representing the current flowing through inductor L1 sensed by current sensor T1. The output of comparator U1 provides an input to the reset (R) input of a latch U2. The latch U2 receives a clocking input VCK at the set input (S). The Q output of the latch controls the opening and closing of the switch S1. The compensating ramp VRAMP is generated using a clocking signal VCK to open and close a switch which in turn is connected in parallel with a capacitor that receives current from a current source. VRAMP is subtracted from the error signal VERR1 so as to aid in stabilizing the current loop formed by comparator U1, latch U2, power switch S1 and current sensor T1. A clamp formed by diode D2 and voltage source VCL clamps the value of VERR1 to a maximum limited value.

Operation is as follows. At the rising edge of the clock signal VCK, latch U2 is set and switch S1 turns on. The input voltage VIN is applied to the inductor L1, and the current ramps upward. When the current sensed by T1 reaches a value equal to the error signal VERR2, the latch is reset and the switch S1 is turned off. In normal operation, the error amp U3 adjusts the value of the error signal VERR1 in order to maintain a constant output voltage. During current limit operation, however, the error signal increases until it is limited to a maximum value set by the clamp formed from diode D2 and source VCL.

Since the compensating ramp VRAMP is subtracted from the clamped error signal VERR1 to create the compensated error signal VERR2, the value of VERR2 at the moment that switch S1 is turned off will vary with the ON-time (Duty Cycle) of switch S1. As a result, the peak current during current limit will vary with output voltage, increasing as the output voltage decreases. If the amplitude of the compensating ramp is approximately equal to the clamp voltage set by VCL, then the peak current during current limit operation can vary by as much as 2:1 as the output voltage varies. This variation in the peak current is illustrated in FIG. 2.

Variation in Ripple Current

A second obstacle to obtaining a constant average current during current limit is the variation in ripple current that naturally occurs with changes in Vin and Vout. The ripple current is given approximately by:

$$(V_{IN}-V_{OUT})^*t_{ON}/L,$$

wherein L is the value of the inductor, and $t_{ON}$ is the ON-time of the switch S1.

When the ripple current is very small, the average output current is nearly the same as the peak current. When the ripple current is larger, the average output current is much less than the peak current. Since it is the peak current that is actually limited, the average output current will increase as the output voltage decreases, due to the decreasing ON-time of the switch S1. This so-called peak to average error is an artifact of peak-current control, and is present even when no compensating ramp is used. FIG. 3 illustrates how the average output current changes during current limit as a result of this peak to average error. Note that for FIG. 3 the compensating ramp has been set to zero so as to better illustrate the peak to average error.

Minimum Controllable ON-Time

A third obstacle to achieving a constant average current during current limit is the minimum controllable ON-time of switch S1. In FIG. 1, this is represented by the pulse width of VCK. Since latch U2 is set dominant, switch S1 will always be on for at least this minimum on-time, $T_{ON,LIM}$. In current limit operation, as the output voltage is decreased, the ON-time will decrease until it reaches this limiting value $T_{ON,LIM}$. At this point, since the ON-time cannot be reduced any further, the average voltage delivered to the load becomes fixed, and the output current will increase significantly as the load resistance is further decreased. When the output voltage reaches zero, the average output current will be given approximately by:

$$I_{AVG,MAX}=V_{IN}^*T_{ON,LIM}^*F_{SW}/R_{PAR}$$

wherein Fsw is the switching frequency of switch S1, and Rpar is the parasitic resistance, which includes the switch S1, inductor and all other parasitic resistances.

FIG. 4 shows a typical voltage versus current characteristic for the DC/DC converter of FIG. 1. The initial tail-out of the average output current (the part of the curve between A and B) is caused by the variation in peak current due to slope compensation and the peak to average error. The sharp tail-out at lower output voltage (commencing at B) is caused by the minimum ON-time constraint.

The overall effect of these three obstacles is a very undesirable increase in output current during current limit operation. What is desirable is to provide a DC/DC converter that will provide a constant average output current characteristic during current limit, labeled "Desired Current Limit" in FIG. 4, a condition sometimes referred to as a "brick wall," because of the substantial vertical fall off.

PRIOR ART SOLUTIONS

There are numerous prior art solutions that attempt to address these three obstacles to obtaining a constant average output current characteristic. To address the variation of peak current with slope compensation, a common approach is to apply the clamp to the error signal after the compensating ramp is subtracted. This can practically be implemented in a variety of ways, one example being illustrated in FIG. 5a. In this example, the clamp on the error amplifier output VERR1 is applied after the subtraction of the compensating ramp. This ensures that the sensed peak current is always limited at the same value, independent of duty cycle.

One issue with this approach is that it effectively eliminates the compensating ramp during current limit operation, resulting in a current limit loop that may not be stable.

A second approach that overcomes this issue of instability during current limit is illustrated in FIG. 5b. In this approach, the value of the clamp on VERR1 is adjusted dynamically based on the duty cycle so as to cancel the effect of slope compensation on peak current limit. As shown in FIG. 5b, a voltage VADJ is generated that corresponds to the instantaneous value of the compensating ramp at the time that switch S1 turns off. This voltage is then added to the VCL1 voltage to create the clamp voltage VCL2.

Both of these prior art solutions shown in FIGS. 5a and 5b can achieve a peak current limit that is essentially independent of duty cycle. In both cases, however, the amplitude of the compensating ramp is removed from the dynamic range of the compensated error signal. In other words, if by way of example, the output of the error amplifier U3 has a swing of 4V, and the compensating ramp has an amplitude of 2V, then the total swing at the positive input of the comparator U1 would be limited to 2V. This loss of dynamic range is highly undesirable, as it can increase noise and jitter, and also cause voltage overshoot on recovery from a current limit condition.

Another common approach to achieving a constant average output current is to add an average current limit loop as illustrated in FIG. 6. During normal operation, the average current limit loop is not active. During current limit, however, amplifier U4 senses the average of the current sense signal provided by the current sensor T1, and compares this against a reference value VREF2. The resulting error signal VERR3 is used to adjust the peak current limit clamp so as to maintain a constant average output current. A significant disadvantage of this technique is that the average current loop must be relatively slow in order to achieve stability. As a result, very large output currents can still occur for significant portions of time. Moreover, this approach does not address the problem with minimum ON-time.

To address the minimum ON-time constraint and the associated current limit increase, many converters make use of some form of frequency fold-back. Typically, this is implemented by reducing the switching frequency Fsw of switch S1 as the output voltage decreases. At lower output voltages, the reduced switching frequency reduces the effective duty cycle that can be achieved, thereby allowing the peak current limit to be controlled. While this can be effective at reducing the sharp tail-out (between points B and C shown in FIG. 4) of the current at low output voltages, it has a tendency to either over-correct or under-correct for the minimum ON-time constraint. This happens because the amount of frequency fold-back needed is actually dependent on VIN as well as VOUT, while only VOUT is conventionally used to determine the amount of frequency fold-back. If too much frequency fold-back is used, then the resultant increase in ripple current due to reduction in Fsw will cause the converter to show a current fold-back characteristic, where the available output current decreases with decreasing output voltage. This is undesirable in that it can result in a latch-up condition when driving a constant-current load.

SUMMARY

In accordance with one aspect of the teachings of this disclosure, a DC/DC converter is configured to provide a regulated output voltage and an current limited output current to a load. The converter comprises an inductor arranged to conduct a current to the output of the converter. A switch is responsive to a pulse width modulation signal and configured to control the current conducted to the output through the inductor as a function of the ON-time when the switch is closed during each cycle of the pulse width modulation signal. A feedback control is responsive to the inductor current and output voltage and is configured to: (a) provide the pulse width modulation signal to control the operation of the switch so that the inductor current has a peak current value and a ripple about an average value and for each cycle of the pulse width modulation signal at the end of each ON-time of the switch during each cycle; and (b) generate a compensating ramp signal for adjusting the duty cycle of the pulse width modulation signal so as to stabilize the feedback loop of the feedback control. The feedback control includes a clamp for providing a limited voltage as a function of the desired peak current limit during current limit conditions, and a modulator for modulating the clamp voltage as a function of ripple of the inductor current for each cycle of the pulse width modulated signal so as to reduce or cancel the effect of the inductor ripple current on the average output current during current limit conditions. A bias signal control is configured to apply a variable DC bias signal to the compensation ramp signal so that the compensation ramp signal is biased to an instantaneous value of zero at the end of each ON-time for each cycle in order that the peak current limit is independent of the duty cycle of the pulse width modulation signal during current limit conditions A frequency foldback control is used to adjust the frequency of the pulse width modulation signal during current limit conditions as a function of the input voltage and the output voltage of the converter.

In accordance with another aspect of the teachings of this disclosure, a method of provides a limited output current at a regulated voltage to a load. The method comprises operating a switch arranged to be coupled to an input source so as to switch a current through an inductor with a pulse width modulation signal so as to control the current conducted through the inductor as a function of the ON-time when a switch is closed during each cycle of the pulse width modulation signal The pulse width modulation signal is generated in response to the inductor current and output voltage so as to control the switching of the current through the inductor so that the current has a peak current value and a peak to peak ripple about an average value for each cycle of the pulse width modulation signal at the end of each ON-time of the switch during each cycle. The pulse width modulation signal is further generated as a function of a clamping voltage set as a function of the desired peak current limit during current limit conditions A compensating ramp signal is generated for adjusting the duty cycle of the pulse width modulation signal so as to stabilize the feedback loop of the feedback control A variable DC bias signal is applied to the compensation ramp signal so that the compensating ramp signal is biased to an instantaneous value of zero at the end of each ON-time for each cycle so that the peak current limit is independent of the duty cycle of the pulse width modulation signal during current limit conditions. The clamp voltage is modulated as a function of ripple of the output current for each cycle of the pulse width modulated signal so as to reduce or cancel the effect of the inductor ripple current on the average output current during current limit conditions. The frequency of the pulse width modulation signal is adjusted during current limit conditions as a function of the input source voltage and the output load voltage.

In accordance with yet another aspect of the teachings of this disclosure, a DC/DC converter is configured to provide a regulated output voltage and a limited output current to a load. The converter comprises an inductor arranged to conduct current to the output of the converter A switch, responsive to a pulse width modulation signal, is configured to control current conducted through the inductor as a function of the ON-time when the switch is closed during each cycle of the pulse width modulation signal A feedback control, responsive to the inductor current and output voltage, is configured to provide the pulse width modulation signal to control the operation of the switch so that the inductor current has a peak current value for each cycle of the pulse width modulation signal at the end of each ON-time of the switch during each cycle. The feedback control is also configured to generate a compensating ramp signal for adjusting the duty cycle of the pulse width modulation signal so as to stabilize the feedback loop of the feedback control A bias signal control is configured to apply a variable DC bias signal to the compensation ramp signal so that the compensating ramp signal has an instantaneous value of zero at the end of each ON-time for each cycle in order that the peak current limit is independent of the duty cycle of the pulse width modulation signal during current limit conditions.

In accordance with still another aspect of the teachings of this disclosure, a method provides a limited output current at a regulated voltage to a load. The method comprises operating a switch with a pulse width modulation signal in order to switch a current through an inductor arranged to conduct current to the load so as a control the inductor current as a function of the ON-time that the switch is closed during each cycle of the pulse width modulation signal. The pulse width modulation signal is generated in response to the inductor current and output voltage so as to control the switching of the inductor current in a feedback control arrangement so that the current has a peak current value for each cycle of the pulse width modulation signal at the end of each ON-time of the switch during each cycle A compensating ramp signal is generated for adjusting the duty cycle of the pulse width modulation signal so as to stabilize the operation of the feedback control arrangement. A variable DC bias signal is applied to the compensation ramp signal so that the compensating ramp signal is biased to an instantaneous value of zero at the end of each ON-time for each cycle in order that the peak current limit is independent of the duty cycle of the pulse width modulation signal during current limit conditions.

In accordance with yet another aspect of the teachings of this disclosure, a DC/DC converter is configured to provide a regulated output voltage and a limited output current to a load. The converter comprises an inductor arranged to conduct a current to the output of the converter A switch is responsive to a pulse width modulation signal and is configured to control the current conducted through the inductor as a function of the ON-time when the switch is closed during each cycle of the pulse width modulation signal. A feedback control is responsive to the inductor current and output voltage and configured to provide the pulse width modulation signal to control the operation of the switch so that the inductor current has a peak to peak ripple about an average value for each cycle of the pulse width modulation signal The feedback control further includes (a) a clamp for providing a limited clamp voltage as a function of the desired peak current limit during current limit conditions; and (b) a modulator for modulating the clamp voltage as a function of ripple of the inductor current for each cycle of the pulse width modulated signal so as to reduce or cancel the effect of inductor ripple current on the average output current during current limit conditions.

In accordance with still another aspect of the teachings of this disclosure, a method provides a current limited output current at a regulated voltage to a load. The method comprises operating a switch with a pulse width modulation signal so as to switch a current through an inductor arranged to conduct a current to an output so as to control the current conducted through the inductor as a function of the ON-time that a switch is closed during each cycle of the pulse width modulation signal. The pulse width modulation signal is generated in response to the inductor current and output voltage so as to control the switching of the inductor current so that the current has a peak to peak ripple about an average value for each cycle of the pulse width modulation signal at the end of each ON-time of the switch during each cycle. The pulse width modulation signal is further generated as a function of a clamping voltage set as a function of the desired peak current limit during current limit conditions. The clamp voltage is modulated as a function of ripple of the inductor current for each cycle of the pulse width modulated signal so as to reduce or cancel the effect of the inductor ripple current on the average output current during current limit conditions.

In accordance with yet another aspect of the teachings of this disclosure, a DC/DC converter is configured to provide a regulated output voltage and a limited output current to a load. The converter comprises an inductor arranged to conduct the current to the output of the converter. A switch, responsive to a pulse width modulation signal, is configured to control the current conducted through the inductor as a function of the ON-time when the switch is closed during each cycle of the pulse width modulation signal. A frequency foldback control is used to adjust the frequency of the pulse width modulation signal during current limit conditions as a function of the input voltage and the output voltage of the converter.

In accordance with still another aspect of the teachings of this disclosure, a method provides a limited output current at a regulated voltage to a load. The method comprises operating a switch arranged to be coupled to an input source with a pulse width modulation switch so as to switch a current through an inductor arranged to conduct current to an output and control the current conducted through the inductor as a function of the ON-time when the switch is closed during each cycle of the pulse width modulation signal. The method also includes adjusting the frequency of the pulse width modulation signal during current limit conditions as a function of the input source and the output load voltage.

These, as well as other components, steps, features benefits, and advantages, will now become clear from a review of the following detailed description of illustrative embodiments, the accompanying drawings, and the claims.

GENERAL DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

DETAILED DESCRIPTION OF THE DRAWINGS

Illustrative embodiments are now discussed. Other embodiments may be used in addition or instead. Details that may be apparent or unnecessary may be omitted ensure conciseness or for a more effective presentation. Conversely, some embodiments may be practiced without all of the details that are disclosed.

Figure 1:
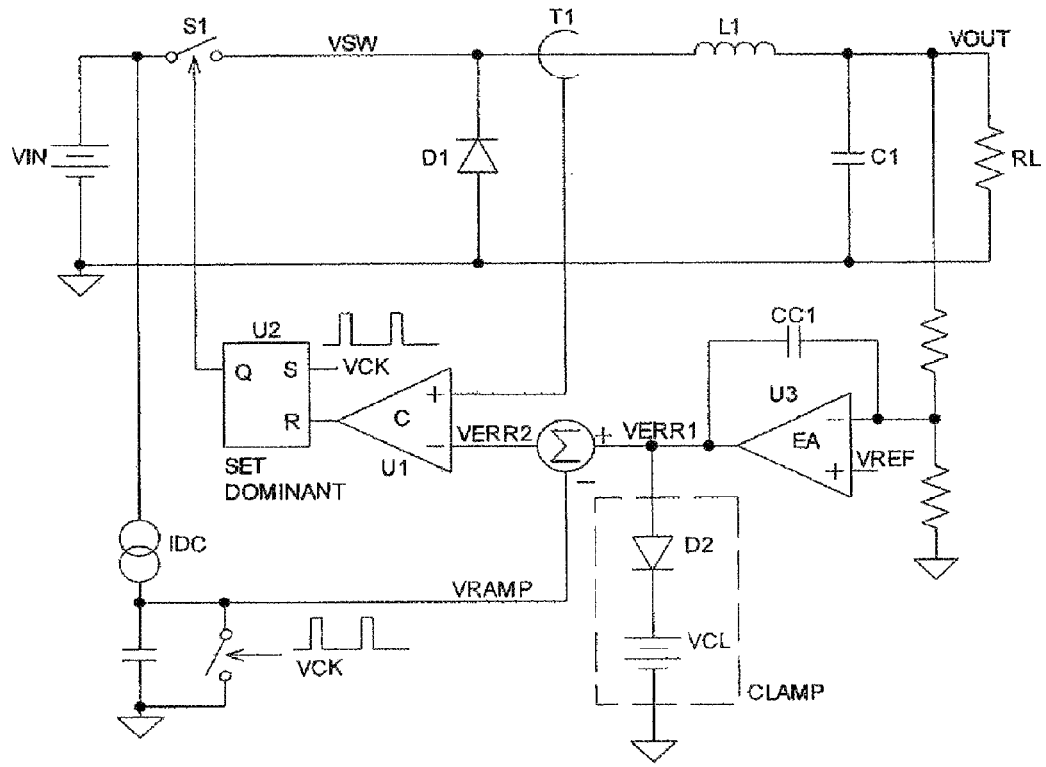
FIG. 1 is a partial schematic, partial block diagram illustrating a prior art DC/DC converter that presents one obstacle to achieving a constant average output current characteristic during current limit due to the variation in the peak current limit with duty cycle due to the compensating ramp generated in the converter.
Figure 2:
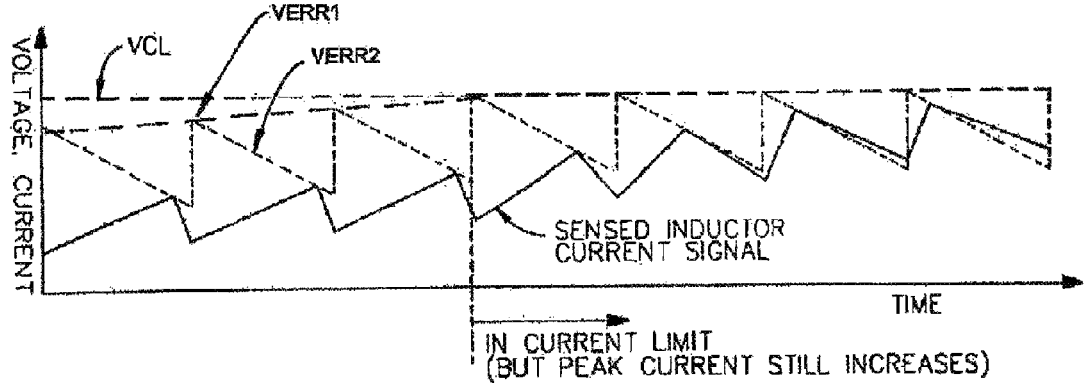
FIG. 2 is a timing diagram further illustrating the problem provided by the prior art configuration shown in FIG. 1.
Figure 3:
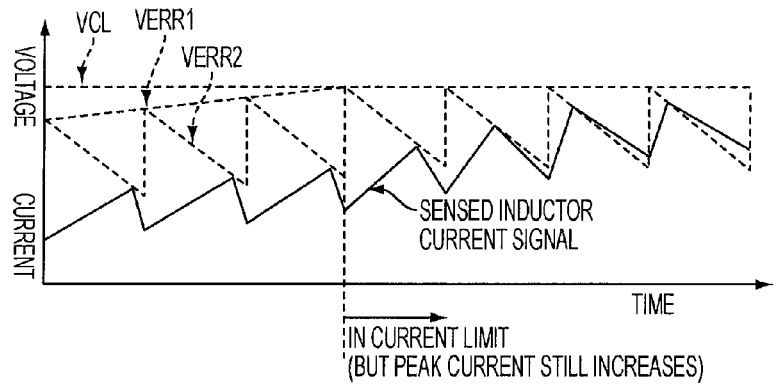
FIG. 3 is a graphical illustration of how the average output current changes during current limit as a result of the peak to average current error in the configuration of FIG. 1.
Figure 4:
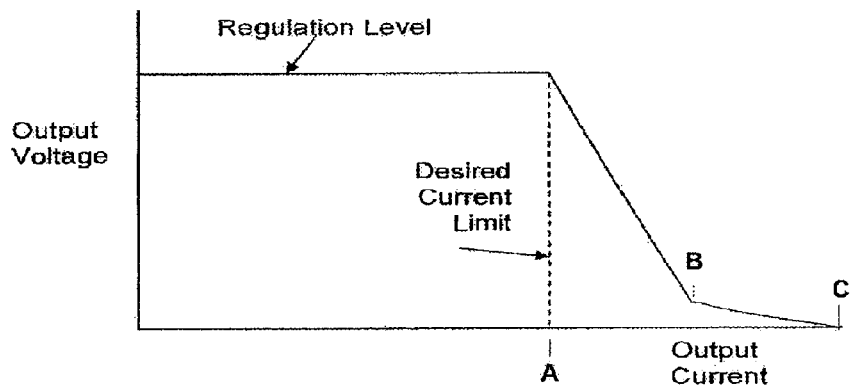
FIG. 4 shows a graphical illustration of a typical voltage versus current characteristic for the DC/DC converter of FIG. 1.
Figure 5A:
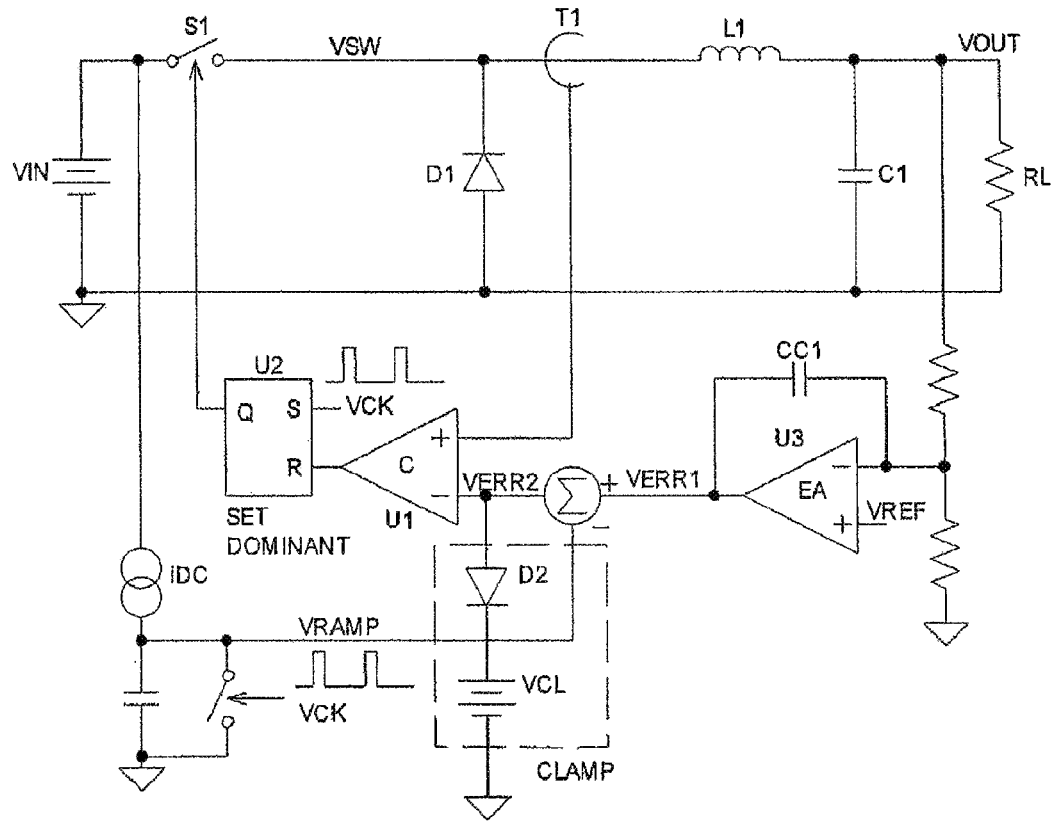
FIG. 5a is a partial schematic, partial block diagram illustrating a prior art DC/DC converter.
Figure 6:
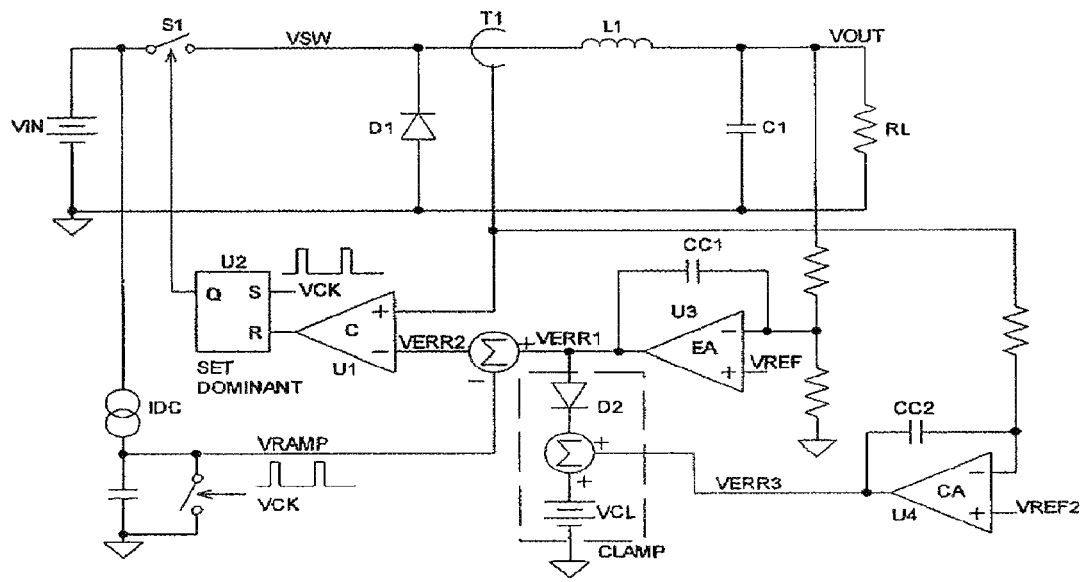
FIG. 6 is a partial schematic, partial block diagram illustrating another prior art DC/DC converter.
Figure 5B:
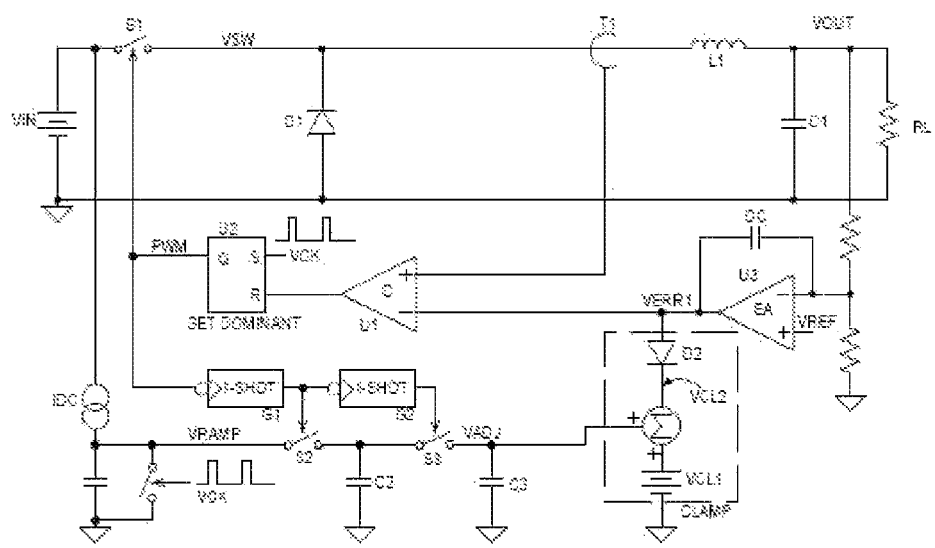
FIG. 5b is a partial schematic, partial block diagram illustrating another prior art DC/DC converter
Figure 7:
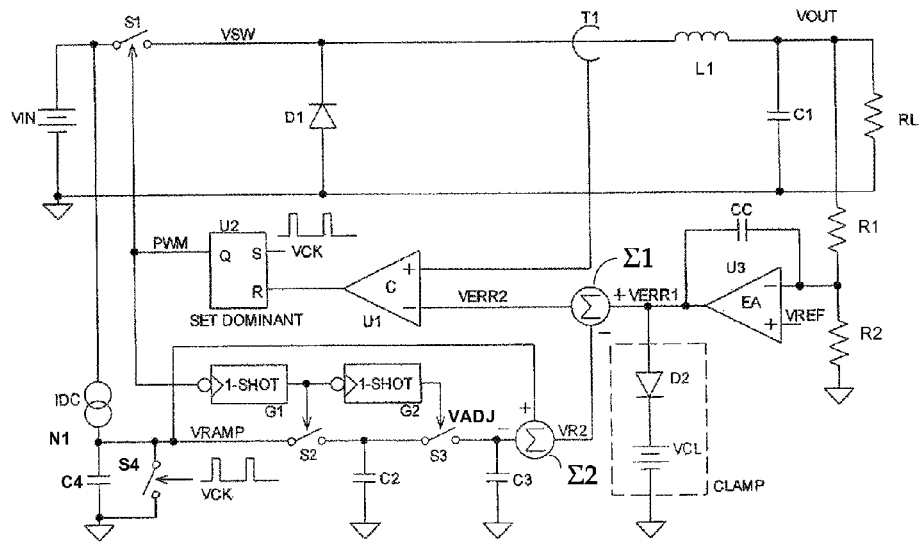
FIG. 7 is a partial schematic, partial block diagram of one embodiment of a DC/DC converter incorporating the teachings described herein.
Figure 9:
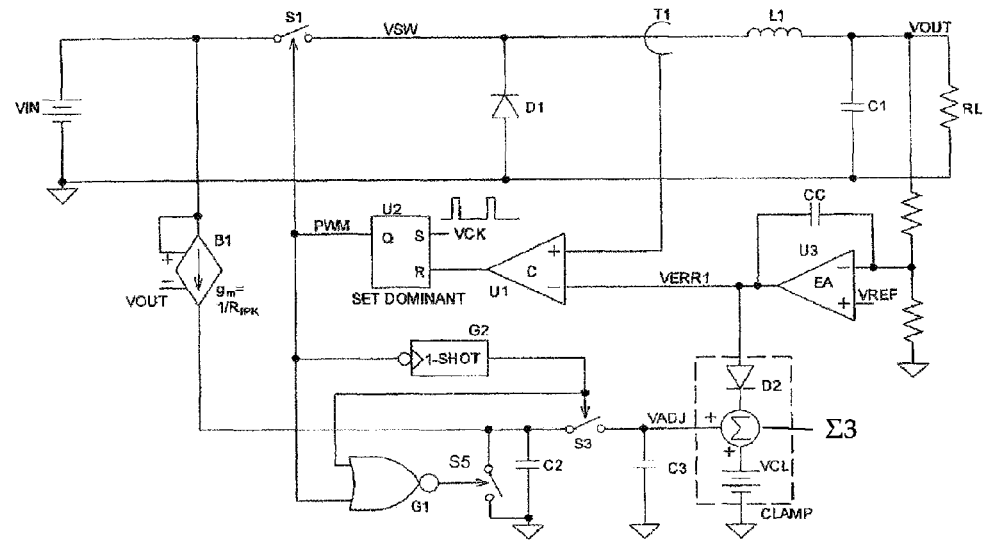
FIG. 9 is a partial schematic, partial block diagram of a second embodiment of a DC/DC converter incorporating the teachings described herein.
Figure 11:
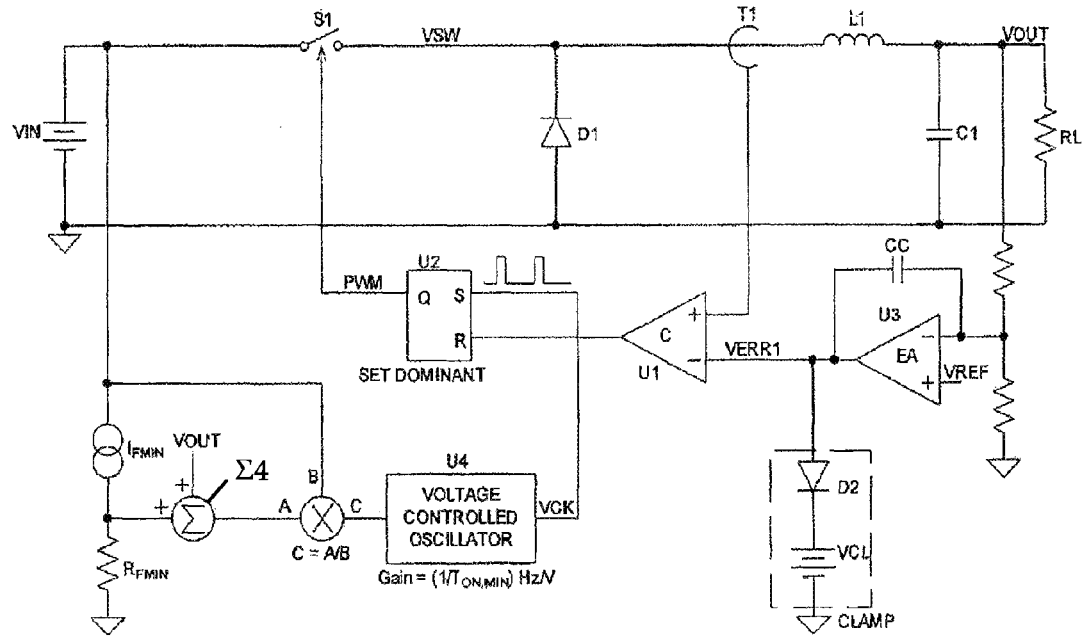
FIG. 11 is a partial schematic, partial block diagram of a third embodiment of a DC/DC converter incorporating the teachings described herein.

In order to achieve an average current limit that is both fast and accurate approaching a brick wall solution, three separate configurations illustrated by the respective embodiments shown in FIGS. 7, 9 and 11 overcome the corresponding three obstacles mentioned above. While any one or two of the configurations can be implemented separately from the other (s), best results are achieved when all three are incorporated into a DC/DC converter configuration.

Variation in Peak Current Limit with Duty Cycle.

In accordance with the teachings described herein, the variation in peak current with duty cycle during current limit is eliminated by varying the DC bias of the compensating ramp so that it is always equal to zero at the end of the ON-time of switch S1. One embodiment for accomplishing this is shown in FIG. 7. As shown, an input voltage source VIN is connected between one side of switch S1 and system ground. The other side of switch S1 is coupled to the cathode of diode D1, and to one end of inductor L1. The other end of inductor L1 is connected to one plate of capacitor C1 and to the load RL. The anode of diode D1 and the opposite ends of the capacitor C1 and the load RL are connected to system ground. A feedback path is provided, with the node formed by connecting the inductor L1, capacitor C1 and the load RL together being connected to the resistor R1 of the voltage divider formed by resistors R1 and R2. The junction of the resistors R1 and R2 is connected to the inverting input of the error amplifier U3. The non-inverting input of the error amplifier U3 is connected to a reference voltage VREF so that the output of the error amplifier, VERR1, is an error signal as a function of the difference between the output voltage VOUT and the reference voltage VREF. The output of the error amplifier U3 is clamped with the clamp circuit formed by diode D2 and voltage source VCL connected between the output of the error amplifier U3 and system ground. The output of the error amplifier U3 is also connected to feedback capacitor CC, which in turn is connected to the inverting input of the amplifier U3 to form a feedback loop for the amplifier U3. The output of the amplifier U3 is also connected to the signal summer Σ1, which in turn provides the error signal VERR2 as a function of the error signal VERR1 less the signal VR2 (described hereinafter). The error signal VERR2 is applied to the inverting input of a comparator U1. The non-inverting input of the comparator is connected to a signal sensor T1, positioned to sense the current through the inductor L1. This sensed current is converted to a voltage by a resistor (not shown). The output of the comparator, which provides a signal as a function of the difference between VERR2 and the current sensed by sensor T1, is connected to the R input of the latch U2. The S input of latch U2 is connected so as to receive a clock signal VCK. The Q output of the latch U2 is a pulse width modulated (PWM) signal, which is used to control the opening and closing of the switch S1.

The PWM output signal of the latch U2 is also applied to one-shot G1. The output of the latter is used to control the opening and closing of the switch S2 and provide an input to one-shot G2. One-shot G2 provides an output that controls the opening and closing of switch S3. A current source IDC is connected in series with the capacitor C4, which in turn is connected to system ground. The current source and capacitor C4 are connected in parallel with the input voltage source VIN. A switch S4 is connected in parallel with capacitor C4, both being connected between system ground and the node N1 formed between current source IDC and the capacitor C4 and the switch S2. A slope compensation signal VRAMP is provided at node N1 with the operation of switch S4 with the same clocking signal VCK applied to the S input to the latch U2. Node N1 is connected to the switch S2, which in turn is connected to switch S3. Switch S3 is connected to provide the VADJ signal to a minus input of the summer Σ2. Capacitor C2 is provided between system ground and the junction formed between switches S2 and S3, and capacitor C3 is provided between system ground and the junction of switch C3 and summer Σ2. The node N1 (the VRAMP signal) is also connected directly to the positive input of summer Σ2. The output of summer Σ2 is VR2 which equals VRAMP minus VADJ. VR2 is applied to a minus input of summer Σ1, so that the output of summer Σ1, VERR2, is equal to VERR1 minus VR2.

The embodiment shown in FIG. 7 operates as follows, at the end of the switch ON-time (at the trailing edge of each pulse of the signal PWM), one-shot G1 is triggered generating a narrow, positive pulse on its output. This pulse momentarily closes switch S2, so that the VRAMP voltage at this instant is applied to capacitor C2. At the trailing edge of the pulse generated by one-shot G1, switch S2 is opened and a second pulse is generated by one-shot G2. This pulse in turn momentarily closes switch S3, shorting together capacitors C2 and C3. As a result, the cycle-by-cycle value of the slope compensation waveform VRAMP at the moment that switch S1 turns off is sampled and held on capacitor C2. This voltage is then low-pass filtered by capacitor C3, and then subtracted from the original VRAMP waveform. The resulting signal at VR2 is in turn subtracted from the error signal VERR1. Since the instantaneous value of the signal VR2 is always equal to zero at the trailing edge of PWM, the peak current is independent of the duty cycle and the amount of slope compensation added. The amount of filtering needed from capacitor C3 is very slight. Typically, a time constant equal to the switching period is adequate (C2=C3). This approach is superior relative to the prior art described above in that it (1) maintains proper slope compensation and current-loop stability during current limit, (2) does not impact the dynamic range available to the error signal, and (3) has a bandwidth that is comparable to or higher than that of the overall DC/DC converter voltage loop.

Figure 8:
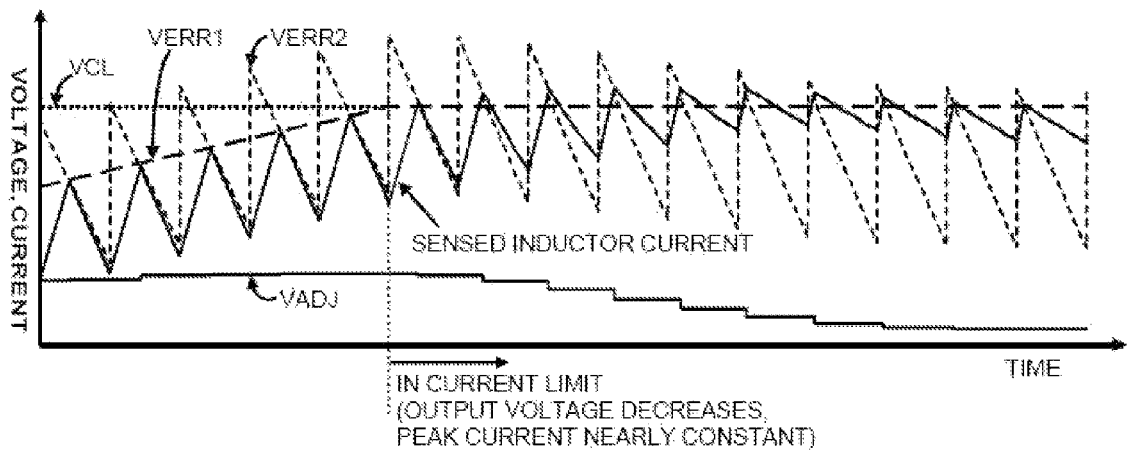
FIG. 8 is a graphical illustration of the response of the FIG. 7 embodiment, when the device goes into current limit.

Another unique advantage of the embodiment described in connection with FIG. 7 is that the circuit is always actively adjusting the DC bias of the compensating ramp, even during normal operation. As a result, it is essentially a new variant on the peak current control architecture itself. In practice, the behavior of a current loop utilizing this approach is not dramatically different from conventional peak current control with slope compensation. FIG. 8 illustrates the operation of FIG. 7 embodiment as this circuit is driven into current limit. Note that as the output voltage collapses (to the right of the dashed vertical line), the voltage VADJ decreases as needed to make the peak sensed inductor current equal to the VCL voltage.

Variation in Ripple Current

In order to overcome the second obstacle to obtaining a constant average current during current limit, an arrangement is provided for addressing the problem of variation in ripple current that naturally occurs with changes in VIN and VOUT. While the arrangement described in connection with the embodiment illustrated in FIG. 7 will make the peak current independent of duty cycle during current limit, the average output current can still vary considerably (15% or more) due to the variation in inductor (L1) ripple current with VIN, VOUT and Fsw. This problem is addressed in accordance with the teachings provided herein by adjusting the peak current limit clamp voltage VCL based on the instantaneous values of VIN, VOUT and Fsw in order to account for the given amount of inductor ripple current.

One embodiment to adjusting the peak current limit clamp voltage VCL based on the these three values is shown in FIG. 9. For illustration purposes, the embodiment of FIG. 9 is shown without the compensating ramp circuit in order to simplify the explanation of the circuit.

In this embodiment, the junction of the input voltage source VIN and the switch S1 is connected to a voltage-controlled current source B1 having a transconductance $g_m$ defined by $1/R_{IPK}$. The output of the voltage-controlled current source is connected to the switch S3, switch S5 and capacitor C2. Switch S5 and capacitor C2 are each in turn connected to system ground, in parallel with one another. The output of switch S3, providing a voltage output VADJ, is connected to capacitor C3 and a plus input to summer Σ3 of the voltage clamp, the summer being connected between the diode D2 and the voltage source VCL so that VADJ adjusts the clamp voltage. Capacitor C3 and the voltage clamp are each connected to system ground. The clamp is used to clamp voltage VERR1, the output of the error amplifier U3. The output of error amplifier EA is connected to the inverting input of the comparator U1, which in turn provides an input to the R input of the latch U2. The pulse width modulated signal PWM output of the latter is used to operate switch S1, and is also provided to the NOR gate G1 and one-shot G2. The output of one-shot G2 is connected to a second input of NOR gate G1 and is also used to operate switch S3.

Note that the peak to peak inductor ripple current is given approximately by $$\Delta I_L = (V_{IN} - V_{OUT}) * t_{ON}/L,$$

wherein $t_{ON}$ is the instantaneous switch ON-time (the time when the VSW voltage is high). If a voltage corresponding to ½ of this inductor ripple current were added to the clamp voltage VCL, then the average output current during current limit would be independent of changes in inductor ripple current. In the circuit embodiment of FIG. 9, the voltage-controlled current source B1 generates a current of $$(V_{IN} - V_{OUT})/R_{IPK}.$$

During the switch S1 ON-time $t_{ON}$ (when PWM is high), this current charges capacitor C2. Consequently, the peak voltage on capacitor C2 will be proportional to the inductor ripple current. When the PWM signal falls, capacitor C2 will stop charging, and one-shot G2 will generate a positive pulse that will momentarily short capacitors C2 and C3 together. In this manner, the peak voltage on capacitor C2 is sampled & held and then low-pass filtered by capacitor C3. The resulting voltage is then summed with the clamp voltage VCL, so that the clamp voltage is adjusted in proportion to the inductor ripple current. If $R_{IPK}$ is chosen such that $$R_{IPK} = 2L/(R_S C_2)$$

where Rs is the effective resistance of current sensor T1, then the average output current in current limit will be independent of inductor current ripple. The amount of filtering needed from C3 is very slight. Typically, a time constant equal to the switching period is adequate (C2=C3).

Figure 10:
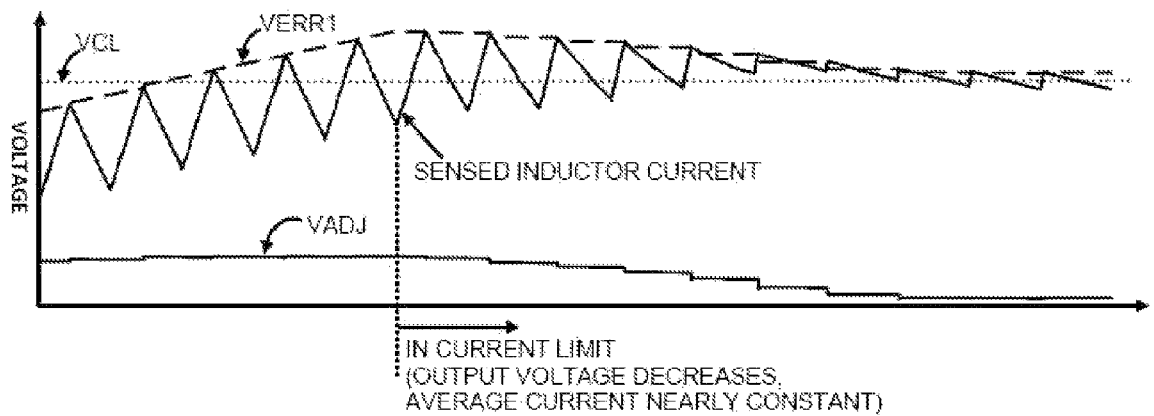
FIG. 10 is a graphical illustration of the response of the FIG. 9 embodiment, when the device goes into current limit.

FIG. 10 illustrates an exemplary operation of the FIG. 9 embodiment, as the circuit is driven into current limit. Note that as the output voltage collapses, the VADJ voltage causes VERR1 to decrease so as to keep the average sensed inductor current approximately equal to the VCL voltage.

Minimum Controllable ON-Time

With the above two improvements described in connection with FIGS. 7-10 in place, the average current limit entry point will be independent of VIN and Fsw, and the average output current will remain constant as the output voltage falls. If the ON-time of switch S1 drops to the minimum achievable level $T_{ON,MIN}$, then the output current becomes difficult to control and 1:1 dependent on switching frequency Fsw, the third obstacle to achieving a constant average current during current limit. To prevent this, a third improvement can be used to reduce the switching frequency Fsw by the optimum amount to keep the ON-time at an approximately constant value $T_{ON,MIN}$ that is somewhat greater than the hard-stop minimum ON-time $T_{ON,MIN}$. It is desirable to keep the switching frequency Fsw as high as possible, but always low enough so that the switch ON-time is always greater than $T_{ON,MIN}$. In this manner, the peak current loop (modified by the above two improvements) will always maintain control and provide an instant average output current that is both fast and accurate.

The average output current $I_{OUT}$ is given by $$I_{OUT}=V_{IN}*D/(R_L+R_{PAR}),$$

where $R_L$ is the load resistance, $R_{PAR}$ is the parasitic resistance, and D is the duty cycle. If operating at a constant ON-time, $T_{ON,MIN}$, then duty cycle can be written as $$D=FswT_{ON,MIN}.$$

Replacing $R_L$ with $V_{OUT}/I_{OUT}$ and solving for Fsw gives $$Fsw=(R_{PAR}I_{OUT}+V_{OUT})/V_{IN}T_{ON,MIN}).$$

This equation can be readily implemented by sensing VIN and VOUT and using an analog divider to achieve the needed fold-back characteristic that keeps the ON-time relatively constant and above the hard stop limit.

One embodiment for keeping the switch ON-time always greater than the hard-stop minimum is illustrated in FIG. 11. As shown a feed forward loop is provided and includes a current source $I_{FMIN}$ connected to the node between the input voltage source VIN and the switch S1. The node is connected to the B input of divider (C=A/B). The source IFMIN is connected to a positive input of the summer Σ4, which also receives VOUT at another positive input. The output of Σ4 is thus the sum of the voltages appearing at the two positive inputs, which is applied to the A input of the C=A/B divider. The C output of the divider is connected to the input of the voltage controlled oscillator U4. The latter has a gain=(1/$T_{ON,MIN}$) Hz/V. The output of voltage controlled oscillator VCK forms the clocking input to the latch U2.

In this circuit, the resistor $R_{FMIN}$ is used to establish a minimum fold-back frequency limit. $R_{FMIN}$ is chosen so that $$R_{FMIN}=R_{PAR}*I_{OUT}/I_{FMIN},$$

where $I_{OUT}$ is the desired average output current in current limit. By making use of both VIN and VOUT, this invention provides the optimum amount of frequency fold-back for all operating conditions, thereby avoiding the problems associated with prior art solutions.

Figure 13:
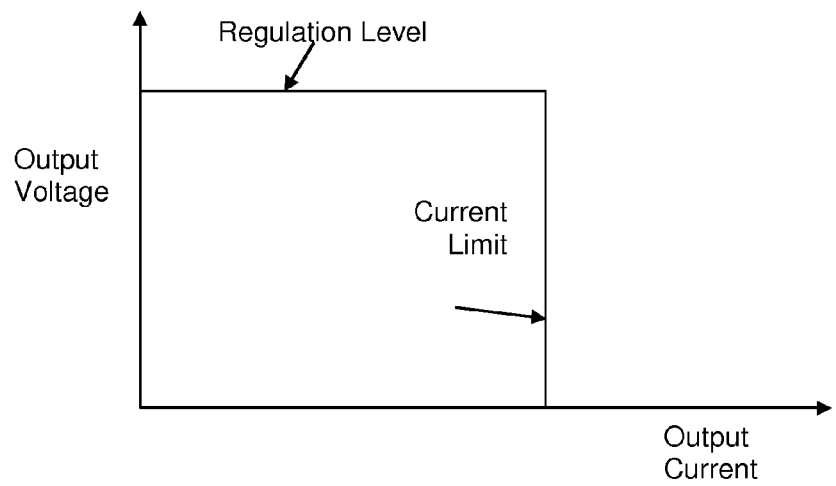
FIG. 13 is a graphical illustration showing an output voltage versus output current characteristic of the FIG. 12 embodiment.
Figure 12:
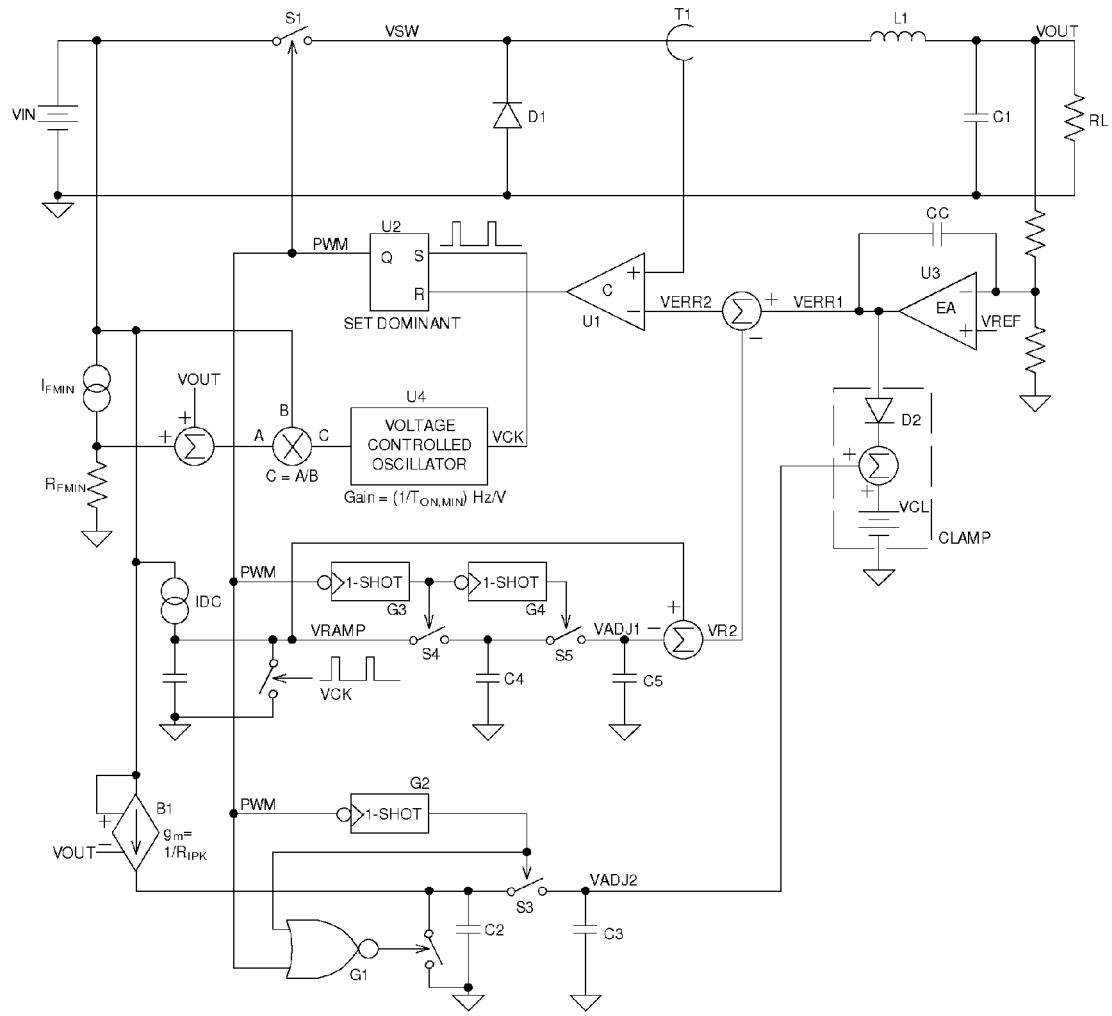
FIG. 12 is a partial schematic, partial block diagram of a fourth embodiment of a DC/DC converter incorporating all three improvements described in connection with FIGS. 7-11.

FIG. 12 illustrates an embodiment of a circuit arrangement that combines all three improvements in order to obtain an average current limit that is both fast and accurate. Using the circuit of FIG. 12, an output voltage versus output current characteristic as shown in FIG. 13 (a "brick wall" response) can be readily obtained.

The components, steps, features, benefits and advantages that have been discussed are merely illustrative. None of them, nor the discussions relating to them, are intended to limit the scope of protection in any way. Numerous other embodiments are also contemplated.

Additionally, embodiments of the present disclosure can have fewer, additional, and/or different components, steps, features, benefits and advantages than as expressly described herein. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. A DC/DC converter configured to provide a regulated output voltage and a limited output current to a load, the converter comprising:
   an inductor arranged to conduct a current to the output of the converter;
   a switch responsive to a pulse width modulation signal and configured to control the current conducted to the output through the inductor as a function of the ON-time when the switch is closed during each cycle of the pulse width modulation signal;
   a feedback control responsive to the inductor current and output voltage and configured to:
   (a) provide the pulse width modulation signal to control the operation of the switch so that the inductor current has a peak current value for each cycle of the pulse width modulation signal at the end of each ON-time of the switch during each cycle and a ripple about an average value; and (b) generate a compensating ramp signal for adjusting the duty cycle of the pulse width modulation signal so as to stabilize the feedback loop of the feedback control; and wherein the feedback control includes a clamp for providing a limited voltage as a function of the desired peak current limit during current limit conditions, and a modulator for modulating the clamp voltage as a function of ripple of the inductor current for each cycle of the pulse width modulated signal so as to reduce or cancel the effect of the inductor ripple current on the average output current during current limit conditions;

a bias signal control configured to apply a variable DC bias signal to the compensation ramp signal so that the compensation ramp signal is biased to an instantaneous value of zero at the end of each ON-time for each cycle so that the peak current limit is independent of the duty cycle of the pulse width modulation signal during current limit conditions; and a frequency foldback control for adjusting the frequency of the pulse width modulation signal during current limit conditions as a function of the input voltage and the output voltage of the converter.

2. A DC/DC converter configured to provide a regulated output voltage and a limited output current to a load, the converter comprising:

an inductor arranged to conduct a current to the output of the converter;

a switch responsive to a pulse width modulation signal and configured to control the current conducted to the output through the inductor as a function of the ON-time when the switch is closed during each cycle of the pulse width modulation signal;

a feedback control responsive to the inductor current and output voltage and configured to:

(a) provide the pulse width modulation signal to control the operation of the switch so that the inductor current has a peak current value for each cycle of the pulse width modulation signal at the end of each ON-time of the switch during each cycle and a ripple about an average value; and (b) generate a compensating ramp signal for adjusting the duty cycle of the pulse width modulation signal so as to stabilize the feedback loop of the feedback control; and wherein the feedback control includes a clamp for providing a limited voltage as a function of the desired peak current limit during current limit conditions, and a modulator for modulating the clamp voltage as a function of ripple of the inductor current for each cycle of the pulse width modulated signal so as to reduce or cancel the effect of the inductor ripple current on the average output current during current limit conditions;

a bias signal control configured to apply a variable DC bias signal to the compensation ramp signal so that the compensation ramp signal is biased to an instantaneous value of zero at the end of each ON-time for each cycle so that the peak current limit is independent of the duty cycle of the pulse width modulation signal during current limit conditions; and a frequency foldback control for adjusting the frequency of the pulse width modulation signal during current limit conditions as a function of the input voltage and the output voltage of the converter;

wherein the bias signal control applies the DC bias signal as a function of the instantaneous value of the compensation ramp signal held by the sample and hold capacitor during each cycle of the pulse width modulation signal.

3. A DC/DC converter according to claim 2, wherein the bias signal control includes a second switch configured to connect a first capacitor to receive the compensation ramp signal at the beginning of each cycle, and a third switch configured to connect the signal stored on the first capacitor to a second capacitor.

4. A DC/DC converter according to claim 3, wherein the bias signal control includes first and second one-shots for opening and closing the second and third switches, respectively.

5. A DC/DC converter according to claim 3, further including a first capacitor for storing a ripple compensation voltage that is proportional to the peak to peak ripple current, a second capacitor for sampling and holding the ripple compensation voltage at the end of the ON-time for each cycle, and a signal summer for summing the ripple compensation voltage with a first clamp voltage, so as to generate a second clamp voltage that determines the peak current limit and is adjusted in proportion to the inductor ripple current.

6. A DC/DC converter according to claim 2, further including a pulse width modulator for generating the pulse width modulation signal as a function of the inductor current and output voltage and a clocking signal, wherein the frequency foldback control includes a voltage control oscillator for generating the clocking signal as a function of the input and output voltages.

7. A method of providing a limited output current at a regulated voltage to a load, comprising:

operating a switch arranged to be coupled to an input source so as to switch a current through an inductor with a pulse width modulation signal so as to control the current conducted through the inductor as a function of the ON-time when a switch is closed during each cycle of the pulse width modulation signal;

generating the pulse width modulation signal in response to the inductor current and output voltage so as to control the switching of the current through the inductor so that the current has a peak current value for each cycle of the pulse width modulation signal at the end of each ON-time of the switch during each cycle and a peak to peak ripple about an average value, the pulse width modulation signal being further generated as a function of a clamping voltage set as a function of the desired peak current limit during current limit conditions;

generating a compensating ramp signal for adjusting the duty cycle of the pulse width modulation signal so as to stabilize the feedback loop of the feedback control;

applying a variable DC bias signal to the compensation ramp signal so that the compensating ramp signal is biased to an instantaneous value of zero at the end of each ON-time for each cycle so that the peak current limit is independent of the duty cycle of the pulse width modulation signal during current limit conditions;

modulating the clamp voltage as a function of ripple of the output current for each cycle of the pulse width modulated signal so as to reduce or cancel the effect of the inductor ripple current on the average output current during current limit conditions; and adjusting the frequency of the pulse width modulation signal during current limit conditions as a function of the input source voltage and the output load voltage.

8. A DC/DC converter configured to provide a regulated output voltage and a limited output current to a load, the converter comprising:

an inductor arranged to conduct current to the output of the converter;

a switch responsive to a pulse width modulation signal and configured to control current conducted through the inductor as a function of the ON-time when the switch is closed during each cycle of the pulse width modulation signal;

a feedback control responsive to the inductor current and output voltage and configured to provide the pulse width modulation signal to control the operation of the switch so that the inductor current has a peak current value for each cycle of the pulse width modulation signal at the end of each ON-time of the switch during each cycle, wherein the feedback control further is configured to generate a compensating ramp signal for adjusting the duty cycle of the pulse width modulation signal so as to stabilize the feedback loop of the feedback control; and a bias signal control configured to apply a variable DC bias signal to the compensation ramp signal so that the compensating ramp signal has an instantaneous value of zero at the end of each ON-time for each cycle so that the peak current limit is independent of the duty cycle of the pulse width modulation signal during current limit conditions.

9. A DC/DC converter configured to provide a regulated output voltage and a limited output current to a load, the converter comprising:

an inductor arranged to conduct a current to the output of the converter;

a switch responsive to a pulse width modulation signal and configured to control current conducted through the inductor as a function of the ON-time when the switch is closed during each cycle of the pulse width modulation signal;

a feedback control responsive to the inductor current and output voltage and configured to provide the pulse width modulation signal to control the operation of the switch so that the inductor current has a peak current value for each cycle of the pulse width modulation signal at the end of each ON-time of the switch during each cycle, wherein the feedback control further is configured to generate a compensating ramp signal for adjusting the duty cycle of the pulse width modulation signal so as to stabilize the feedback loop of the feedback control; and a bias signal control configured to apply a variable DC bias signal to the compensation ramp signal so that the compensating ramp signal has an instantaneous value of zero at the end of each ON-time for each cycle so that the peak current limit is independent of the duty cycle of the pulse width modulation signal during current limit conditions;

wherein the bias signal control includes a sample and hold capacitor for holding an instantaneous value of the compensation ramp signal representative of the compensating ramp signal at the end of the ON-time that the switch is closed for each cycle.

10. A DC/DC converter according to claim 9, wherein the bias signal control is configured to apply the DC bias signal as a function of the instantaneous value of the compensation ramp signal held by the sample and hold capacitor during each cycle of the pulse width modulation signal.

11. A DC/DC converter according to claim 10, wherein the bias signal control includes a second switch configured to connect a first capacitor to receive the compensation ramp signal at the beginning of each cycle, and a third switch configured to connect the signal stored on the first capacitor to a second capacitor.

12. A DC/DC converter according to claim 11, wherein the bias signal control includes first and second one-shots for opening and closing the second and third switches respectively.

13. A method of providing a limited output current at a regulated voltage to a load, comprising:

operating a switch with a pulse width modulation signal so as to switch a current through an inductor arranged to conduct current to the load so as a control the inductor current as a function of the ON-time that the switch is closed during each cycle of the pulse width modulation signal;

generating the pulse width modulation signal in response to the inductor current and output voltage so as to control the switching of the inductor current in a feedback control arrangement so that the current has a peak current value for each cycle of the pulse width modulation signal at the end of each ON-time of the switch during each cycle;

generating a compensating ramp signal for adjusting the duty cycle of the pulse width modulation signal so as to stabilize the operation of the feedback control arrangement; and applying a variable DC bias signal to the compensation ramp signal so that the compensating ramp signal is biased to an instantaneous value of zero at the end of each ON-time for each cycle so that the peak current limit is independent of the duty cycle of the pulse width modulation signal during current limit conditions.

14. A method according to claim 13, wherein applying the variable DC bias signal includes sampling and holding a value of the compensation ramp signal representative of the compensating ramp signal at the end of the ON-time that the switch is closed for each cycle.

15. A method according to claim 14, wherein applying the variable DC bias signal includes applying the DC bias signal as a function of the value of the compensation ramp signal held by a sample and hold capacitor during each cycle of the pulse width modulation signal.

16. A method according to claim 15, wherein applying the DC bias signal includes closing a second switch so that a first capacitor receives the compensation ramp signal at the beginning of each cycle, and closing a third switch so as to connect the signal stored on the first capacitor to a second capacitor.

17. A method according to claim 16, wherein applying the DC bias signal includes triggering first and second one-shots for opening and closing the second and third switches respectively.

18. A DC/DC converter configured to provide a regulated output voltage and a limited output current to a load, the converter comprising an inductor arranged to conduct a current to the output of the converter;

a switch responsive to a pulse width modulation signal and configured to control the current conducted through the inductor as a function of the ON-time when the switch is closed during each cycle of the pulse width modulation signal; and a feedback control responsive to the inductor current and output voltage and configured to provide the pulse width modulation signal to control the operation of the switch so that the inductor current has a peak to peak ripple about an average value for each cycle of the pulse width modulation signal, wherein the feedback control further includes:

(a) a clamp for providing a limited clamp voltage as a function of the desired peak current limit during current limit conditions; and (b) a modulator for modulating the clamp voltage as a function of ripple of the inductor current for each cycle of the pulse width modulated signal so as to reduce or cancel the effect of inductor ripple current on the average output current during current limit conditions.

19. A DC/DC converter according to claim 18, further including a first capacitor for storing a ripple compensation voltage that is proportional to the peak to peak ripple current, a second capacitor for sampling and holding the ripple compensation voltage at the end of the ON-time for each cycle, and signal summer for summing the ripple compensation voltage with the clamp voltage, so as to generate a second clamp voltage that is adjusted in proportion to the inductor ripple current.

20. A method of providing a current limited output current at a regulated voltage to a load, comprising:

operating a switch with a pulse width modulation signal so as to switch a current through an inductor arranged to conduct a current to an output so as to control the current conducted through the inductor as a function of the ON-time that a switch is closed during each cycle of the pulse width modulation signal;

generating the pulse width modulation signal in response to the inductor current and output voltage so as to control the switching of the inductor current so that the current has a peak to peak ripple about an average value for each cycle of the pulse width modulation signal, the pulse width modulation signal being further generated as a function of a clamping voltage set as a function of the desired peak current limit during current limit conditions; and modulating the clamp voltage as a function of ripple of the inductor current for each cycle of the pulse width modulated signal so as to reduce or cancel the effect of the inductor ripple current on the average output current during current limit conditions.

21. A method according to claim 20, further including storing on a first capacitor a ripple compensation voltage that is proportional to the peak to peak ripple current, sampling and holding the ripple compensation voltage at the end of the ON-time for each cycle on a second capacitor, and summing the ripple compensation voltage with the clamp voltage so that the clamp voltage is adjusted in proportion to the inductor ripple current.

22. A DC/DC converter configured to provide a regulated output voltage and a limited output current to a load, the converter comprising:

an inductor arranged to conduct the current to the output of the converter;

a switch responsive to a pulse width modulation signal and configured to control the current conducted through the inductor as a function of the ON-time when the switch is closed during each cycle of the pulse width modulation signal; and a frequency foldback control for adjusting the frequency of the pulse width modulation signal during current limit conditions as a function of the input voltage and the output voltage of the converter.

23. A DC/DC converter according to claim 22, further including a pulse width modulator for generating the pulse width modulation signal as a function of the inductor current, output voltage and a clocking signal, wherein the frequency foldback control includes a voltage control oscillator for generating the clocking signal as a function of the input and output voltages.

24. A method of providing a limited output current at a regulated voltage to a load, comprising:

operating a switch arranged to be coupled to an input source with a pulse width modulation switch so as to switch a current through an inductor arranged to conduct current to an output and control the current conducted through the inductor as a function of the ON-time when the switch is closed during each cycle of the pulse width modulation signal; and adjusting the frequency of the pulse width modulation signal during current limit conditions as a function of the input source voltage and the output load voltage.

25. A method according to claim 24, further including generating the pulse width modulation signal as a function of the inductor current, output voltage and a clocking signal, and adjusting the frequency of the pulse width modulation signal by generating a clocking signal that is as a function of the input source voltage and output load voltage.

* * * * *